United States Patent [19]
Ramos et al.

[11] Patent Number: 5,594,315
[45] Date of Patent: *Jan. 14, 1997

[54] LIQUID COOLED METALLIC INDUCTIVE PROBE FOR HIGH POWER CHARGING

[75] Inventors: Sergio Ramos, Wilmington; John T. Hall, Woodland Hills; Herbert J. Tanzer, Topanga; William Quon, Alhambra, all of Calif.

[73] Assignee: Delco Electronics Corporation, Kokomo, Ind.

[*] Notice: The term of this patent shall not extend beyond the expiration date of Pat. No. 5,412,304.

[21] Appl. No.: 237,493

[22] Filed: Apr. 29, 1994

[51] Int. Cl.$^6$ ........................................... H02J 7/00
[52] U.S. Cl. ........................... 320/2; 336/60; 336/DIG. 2
[58] Field of Search ................... 320/21, 2; 336/DIG. 2, 336/59, 60, 61, 82, 83, 179

[56] References Cited

U.S. PATENT DOCUMENTS

| | | | |
|---|---|---|---|
| 5,095,259 | 3/1992 | Bailey et al. | 320/2 |
| 5,341,083 | 8/1994 | Klontz et al. | 320/2 |
| 5,408,209 | 4/1995 | Tanzer et al. | 336/60 |
| 5,412,304 | 5/1995 | Abbott | 320/2 |
| 5,434,493 | 7/1995 | Woody et al. | 320/2 |

*Primary Examiner*—Edward H. Tso
*Attorney, Agent, or Firm*—Mark A. Navarre

[57] ABSTRACT

An inductive charging coupler for use in inductive charging apparatus for charging a battery. The charging coupler is insertable into a charge port that is coupled to the battery. The charge port comprises a housing, an opening into which the charging coupler is inserted, and a secondary core surrounded by secondary windings. The charging coupler comprises a housing, a primary core, a primary winding having an even number of primary turns disposed around the core, and a hollow coolant conducting heat exchanger symmetrically disposed between the primary turns of the primary winding. The heat exchanger is typically them tally bonded to the primary turns of the primary winding by means of heat conducting adhesive or epoxy. The coolant flow passages of the heat exchanger may be configured in several ways. One approach is to construct thin, flat, self-contained flexible bladders made of metal, such as copper. Adjacent turns of the primary winding are bonded directly to the heat exchanger in order to provide good thermal contact, a large heat transfer area, and a very thin profile. Inlet and outlet coolant passages transition from a very thin rectangular cross sectional shape under the turns to a round tube shape, for attachment to a coolant lines within a flexible hose. The metallic heat exchanger is located at the center of a magnetic field created by the windings, which produces no extra loss in the heat exchanger due to induced eddy currents. The present invention is specifically designed for rapid, high rate charging of electric vehicle batteries.

2 Claims, 3 Drawing Sheets

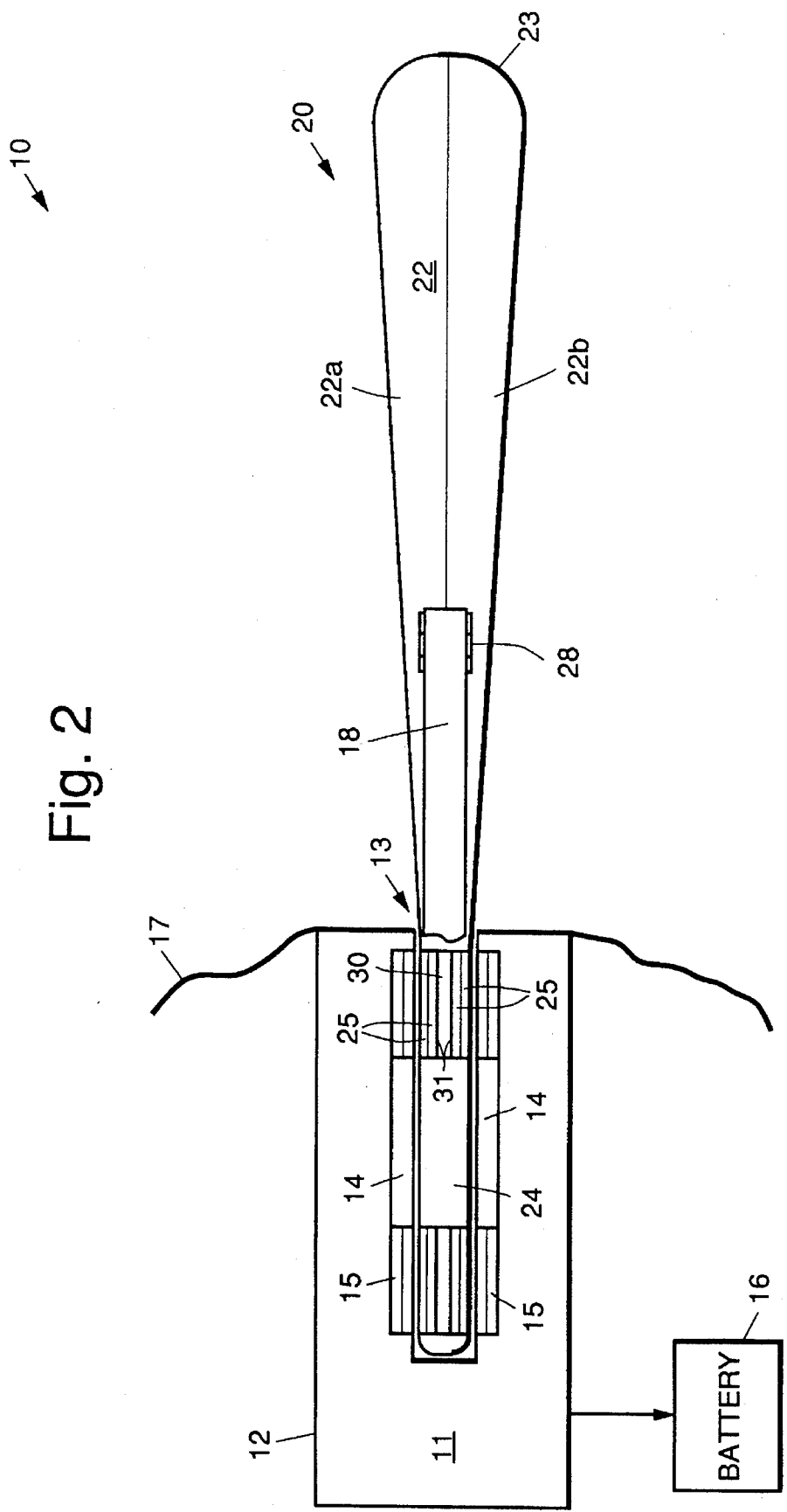

LIQUID COOLED METALLIC INDUCTIVE PROBE FOR HIGH POWER CHARGING

BACKGROUND

The present invention relates to battery chargers, and more particularly, to a liquid cooled metallic inductive charging probe for use in high power battery charging apparatus.

The assignee of the present invention designs, develops and manufactures inductive charging systems for use in charging electric batteries of electric vehicles, and the like. The charging system employs a charge port comprising secondary windings and core that form a secondary of a transformer installed in the electric vehicle, and a charge coupler or probe comprising a primary winding and a core that form a primary of a transformer that is coupled to a power source and which is inserted into the charge port to charge the vehicle batteries. Charging of the batteries is done at high frequency and at high charging rates. Consequently, there is a great deal of heat buildup in the charge probe. The probe must be removed front the charge port by a user once charging is complete, and the touch temperature of the probe is a concern.

Four different approaches may be used to implement thermal management of inductive charge coupler port temperatures. The first approach is to rely on conduction of heat from the primary winding and core across an air gap interface to on-board heat exchangers having cooling air circulated by charge port fans. This approach works for systems operating from about 6 kw to 10 kw charging rates. The second approach is to route chilled air from off-board refrigeration unit through the coupler. This approach works for systems operating at charge rates from about 20 kw to 25 kw. The third approach is to use a plastic or ceramic heat exchanger that does not interact with the magnetic fields produced by the charging system. However, this approach has poor thermal transfer characteristics. The fourth approach is to use a metallic heat exchanger, that interacts with the magnetic field, resulting in a degree of proximity losses, depending on its location in the winding.

Although on-board air or liquid from vehicle cooling systems may become available in some near term electric vehicles, it cannot be universally guaranteed. Furthermore, at charge rates above 25 kw, the increase in size and power consumption of fans and air chillers becomes prohibitive.

Therefore, it is an objective of the present invention to provide for an improved liquid cooled metallic inductive charging probe for use in high power battery charging apparatus.

SUMMARY OF THE INVENTION

In order to meet the above and other objectives, the present invention provides for a charging coupler that may be employed in an inductive charging apparatus for charging a battery, wherein the charging coupler is insertable into a charge port that is coupled to the battery, and wherein the charge port comprises a housing, an opening into which the charging coupler is inserted, and a secondary core surrounded by secondary windings. The charging coupler comprises a housing, a primary magnetic core disposed in the housing, a primary winding having an even number of primary turns disposed around the magnetic core, and a hollow coolant conducting heat exchanger symmetrically disposed between the primary turns of the primary winding. The heat exchanger 30 is typically thermally bonded to the primary turns of the primary winding by means of heat conducting adhesive or epoxy.

The present invention improves upon the fourth approach discussed above, by using a metallic heat exchanger that is inserted in the primary winding such that it has no interaction with the magnetic fields. The present invention circulates liquid coolant from an off-board cooling system (comprised of a pump, compact heat exchanger, fan and optional refrigeration unit housed within a charge station), by routing an inlet and an outlet coolant line within a flexible power cable hose to the charge coupler. The coolant may be comprised of a high dielectric material, such as a polyalphaolefin or flouronert. The high dielectric material exhibits a high resistance such that no current is induced in the coolant from magnetic fields or direct contact with the conductive fields. Within the present charge coupler, heat dissipation from the primary winding and core of the transformer is efficiently removed by incorporating minute internal coolant flow passages that are integrated at the center of the primary winding.

The internal coolant flow passages may be configured in several ways. One approach is to construct thin, flat, self-contained flexible bladders made of metal, such as copper. The primary windings are bonded directly to the heat exchanger to provide good thermal contact, a large heat transfer area, and a very thin profile. The inlet and outlet coolant passages transition from a very thin (0.050", non-final) rectangular cross sectional shape under the windings to a round tube shape (0.25 inches in diameter) for attachment to a flexible coolant lines within the hose. The present invention is applicable for an even number of primary turns in the primary windings.

The present invention uses a metallic heat exchanger located at the center of a magnetic field created by the windings, which produces minimal extra loss in the heat exchanger due to induced eddy currents. The present invention has less loss and is smaller in size than previous transformer devices. The present invention may be used for rapid, high rate charging of electric vehicles. Specifically, the present invention is directed toward the inductive charge coupler which, during charging, is inserted into the charge port disposed in an electric vehicle.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3 shows an mmf diagram that illustrates current versus frequency rise relative to turns of the charge probe;

FIG. 4 illustrates a top view of a portion of the charge probe of FIG. 1; and

FIG. 5 is a side view of the portion of the charge probe of FIG. 4.

DETAILED DESCRIPTION

By way of introduction, the present invention provides for the design of a very high power density, high power, high frequency transformer. In the past, high power density transformers have been limited due to problems in cooling internal copper windings of the transformer. A metallic heat exchanger could not be inserted between windings, due to losses that are introduced (from the internal magnetic fields), and due to the wire construction used in conventional designs that did not have adequate surface area to properly remove the heat.

Cooling has been easily performed at low frequency (60 and 400 Hz) by making the winding a hollow tube winding and pumping a coolant (oil, water, etc) through it. However, this cannot be performed at high frequency (greater than 10 kHz) due excessive eddy current losses introduced by the excessive thickness of the tube that is required. Another method is to place an internal heat exchanger around the winding. Alternative methods of placing metallic heat exchangers internal (interleaved) between the primary and secondary windings were not thought to be possible due to losses in the heat exchanger caused by the internal magnetic fields. Because of these losses, the heat exchanger would have to be made of a non-metallic material having non-optimum heat transfer characteristics. The present invention partially overcomes this problem.

Figure 1:
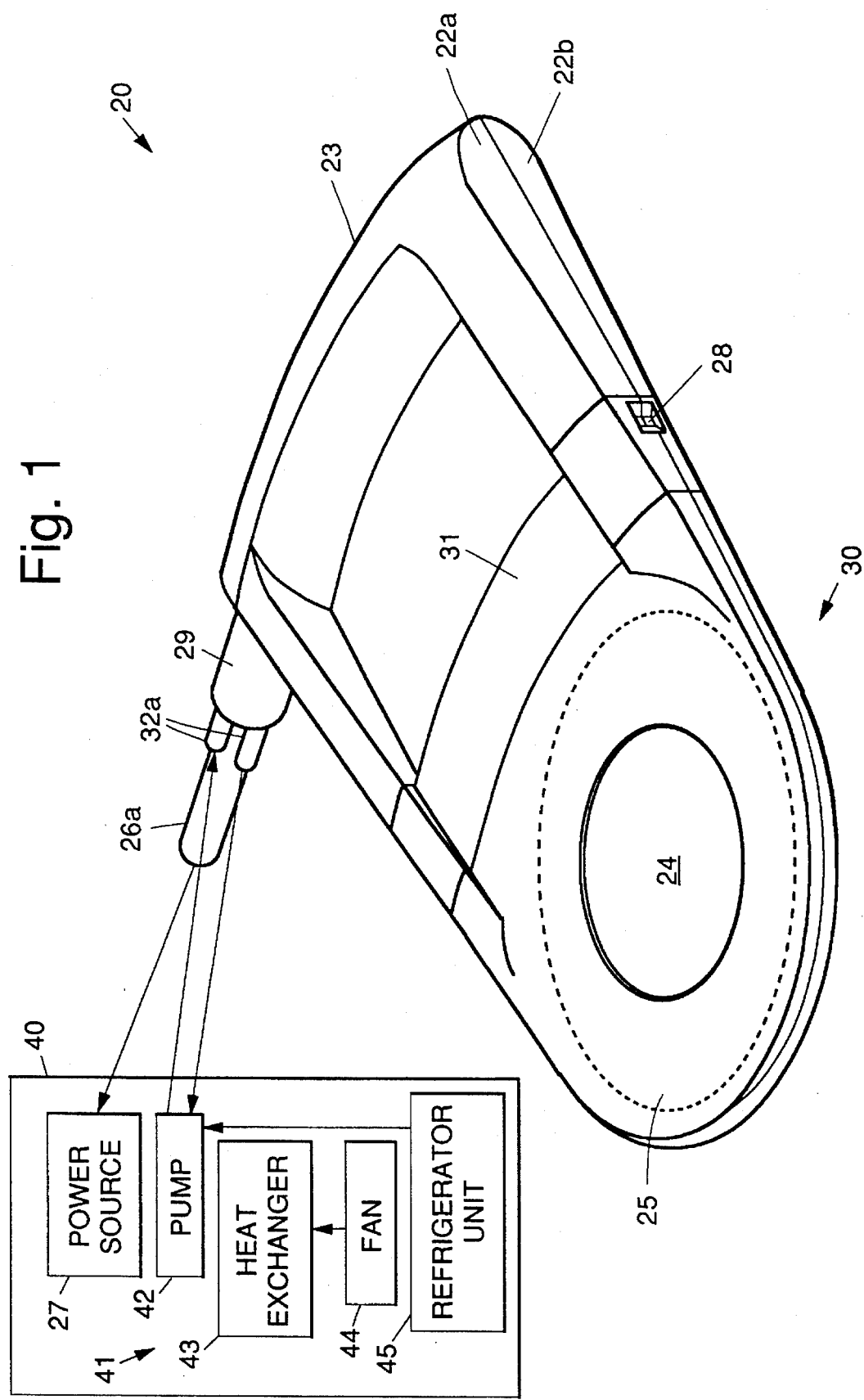
FIG. 1 is a perspective view of a charge probe in accordance with the principles of the present invention.
Figure 2:
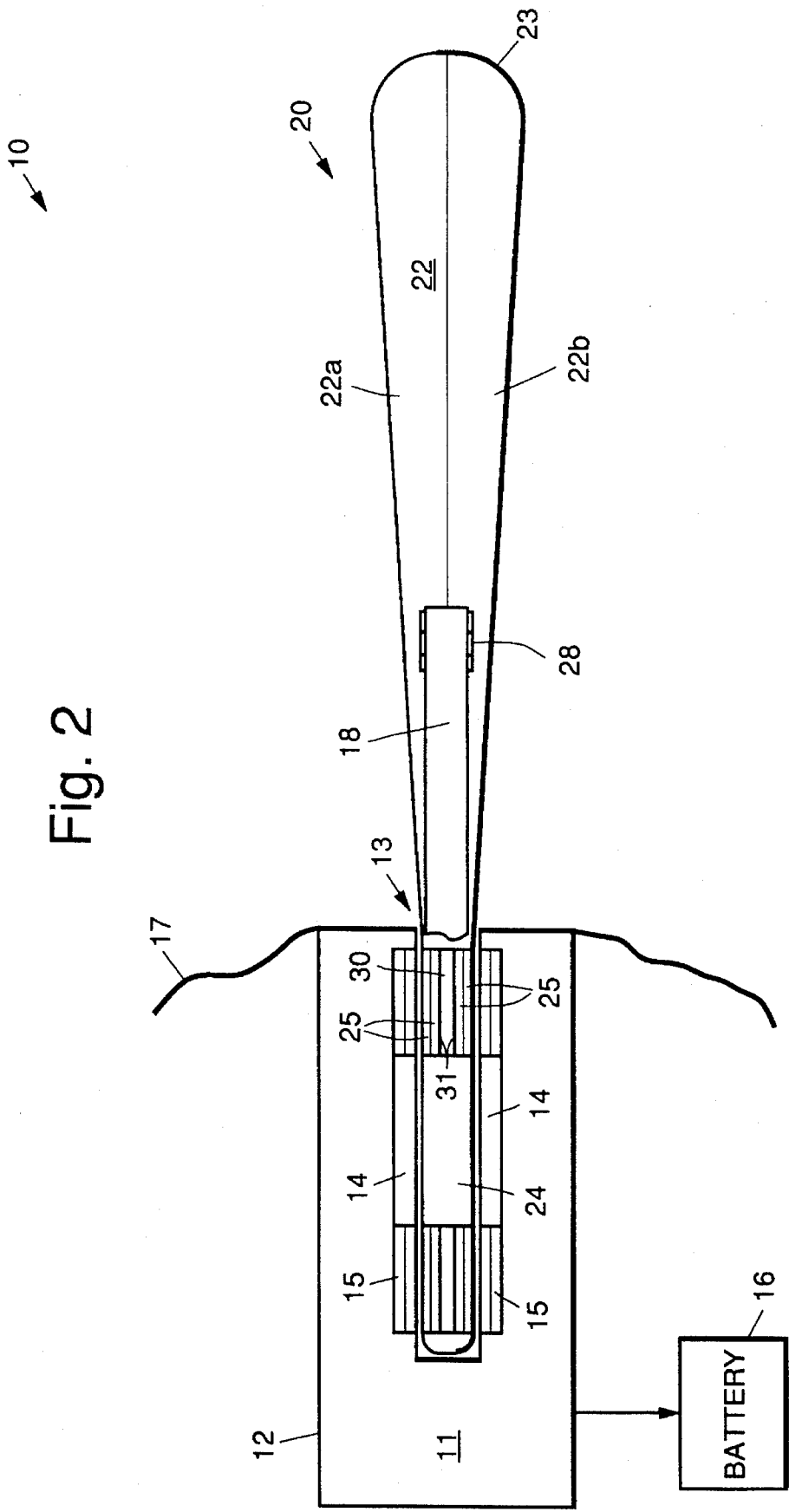
FIG. 2 is a partially cutaway side view of battery charging apparatus employing the charge probe of FIG. 1.

Referring to the drawing figures, FIG. 1 is a perspective view of a charge probe 20 or inductive charging coupler 20 in accordance with the principles of the present invention. FIG. 2 is a partial cross sectional view of inductive charging apparatus 10 that comprises the inductive charging coupler 20 of FIG. 1 inserted into a charge port 11 disposed in an electric vehicle 17, for example.

The charge port 11 includes a housing 12 having an opening 13 into which the inductive charging coupler 20 is inserted. The charge port 11 comprises a secondary core 14 and secondary windings 15 surrounding the core 14. The charge port 11 is coupled to a battery 16 of the electric vehicle 17 in which it is housed. The charge port 11 includes a plurality of metallized electromagnetic interference (EMI) fingers 18 that protrude into the opening 13 and that are adapted to press against the inductive charging coupler 20. The EMI fingers 17 may be comprised of tinned copper, for example.

The inductive charging coupler 20 is comprised of a plastic coupler housing 22 that has two mating coupler halves 22a, 22b that are configured to provide a handle 23. The inductive charging coupler 20 is comprised of a center magnetic core 24 or "puck" 24, that may be comprised of ferrite, for example. A primary winding 25 is disposed around the center magnetic core 24. The primary winding 25 is comprised of four turns. A flexible hose 26 (FIG. 1), which comprises a power cable 26a and inlet and outlet coolant lines 32, is coupled to the primary winding 25 and to an external power source 27 for coupling energy to the charging coupler 20.

The external power source 27 is generally housed within a charge station 40, that also includes a cooling system 41 comprising a coolant pump 42, a coolant heat exchanger 43, a cooling fan 44 and a refrigeration unit 45, as cooling needs require. The present invention circulates liquid coolant from the off-board cooling system 41 in the charge station 40, by routing inlet and outlet coolant lines 32a within the flexible hose 26 to the charge coupler 20. The coolant may be comprised of a high dielectric material, such as a polyalphaolefin or flouronert. The high dielectric material exhibits a high resistance such that no current is induced in the coolant from magnetic fields or direct contact with the conductive fields.

In accordance with the present invention a coolant conducting heat exchanger 30 or bladder 30, is disposed between respective pairs of turns of the primary winding 25. The coolant conducting heat exchanger 30 may be bonded to the turns of the primary winding 25 using conductive adhesive 31 or epoxy, for example. Details of the primary winding 25 and coolant conducting heat exchanger 30 are discussed with reference to FIGS. 3–5 below.

The housing 22 has a hollow disk-shaped section having substantially flat opposed surfaces and the tapered handle extends from the disk section. An opening 34 is disposed through each of the flat opposed surfaces of the hollow disk-shaped section. The center magnetic core 24 is disposed in the opening 34 and has opposed flat surfaces that are substantially coplanar with the substantially flat opposed surfaces of the housing 22.

The charging coupler 20 is designed to be inserted into the opening 13 of the charge port 11 in order to couple current to the battery 15 from the external power source 27. The coupler has two indentations 28 along its respective sides that mate with two projecting fingers extending from the charge port, that provide a tactile feel for a user when it is inserted into the charge port.

The mating coupler halves 22a, 22b of the inductive charging coupler 20 enclose the primary winding 25 and the center magnetic core 24, and secures the hose 26 in the handle 23. A conductive plastic strip 31 may be disposed along an exterior portion of the coupler 20 between the handle 23 and the primary winding 25. The conductive plastic strip 31 engages the metallized electromagnetic interference (EMI) fingers 16 when the coupler 20 is inserted into the charge port 11. A grommet 29 surrounds the hose 26 at a point where it exits the handle 23, and is secured by the two mating coupler halves 22a, 22b.

With the above general description of the construction of the coupler 20, the details regarding the specific improvements of the present invention are as follows. The principles of the present invention may be applied when the primary winding 25 is interleaved with the secondary windings 15, or vice versa. A metallic material may be inserted between the turns of the primary winding 25, with minimal loss, if a minimal magnetic field is present. By looking at an mmf diagram, such its as is shown in FIG. 3, one can determine that in certain winding arrangements, certain turn-to-turn spacings have a near zero field. A metallic heat exchanger may be inserted at the point of zero field, with no power loss. For example, in the case of a four turn primary winding 25, interleaved between a four turn secondary winding 15 (i.e. 2 turn secondary—4 turn primary—2 turn secondary), the two turn secondary windings 15 are connected in series, the mmf diagram clearly shows that there is no field at the center of the four turn primary winding 25, thus the heat exchanger 30 may be sandwiched between the four turns of the primary winding 25 (2 turns—heat exchanger 30—2 turns). As can be seen, this works for an even number of turns. The present invention is further enhanced by the use of flat helix or flat spiral turns for the windings 25. This provides the maximum surface area available for the transfer of heat. The turns of the primary winding 25 are thermally bonded to the heat exchanger 30 using the adhesive 31.

This technique may be applied to any transformer design and specifically applicable to the design of an inductive coupled transformer probe 20 for electric vehicles 17. The thermal limitations are severe for induction coupled transformers used in electric vehicles 17 (i.e. where the transformer primary winding 25 is designed to be physically inserted into the secondary transformer core 14), since there is limited thermal contact between the primary winding 25 and the secondary core 14. The heat exchanger 30 for the probe 20 may be water cooled, for example. The number of turns in the primary winding 25 must be even, and the primary core 25 are generally centered with respect to the turns of the primary winding 25. The secondary windings 15, must be split such that the probe 20 is inserted between them.

In order to better understand the present invention the following theoretical discussion is presented. In transformer design, high frequency operation is desired to reduce the magnetic core size. This is based on the fundamental magnetic equation:

$$E = N * d\phi/dt, \text{ where } d\phi = NdB.$$

This can be rewritten as:

$$Ac = \frac{E}{4fNB \cdot 10^8}$$

where: Ac is the cross sectional area of the core, f is the frequency of operation, N is the number of primary turns, and B is the flux density, in gauss.

Thus it can be seen, that the magnetic core can be smaller, if higher frequency is used to excite the core. However, this is in conflict with the copper winding, which increase as a result of the eddy currents. Eddy current losses is a collective term for the redistribution of alternating current in conductors as a function of frequency (skin effect), and the phenomenon where one circuit carrying alternating current can induce circulating currents, without making ohmic contact, in any conductive material in the immediate vicinity of the circuit (proximity effect). Thus there is a fundamental limitation on how small the transformer core can be, based on the copper losses.

The skin effect loss is an increase in effective resistance due to high frequency current carried by the winding conductor alone. This occurs because as frequency rises, current density increases at the conductor surface and decreases toward zero at the center. The current tails off exponentially within the conductor. The portion of the conductor that is actually carrying current is reduced, so the resistance at high frequency (and resulting losses) can be many times greater than at low frequency. Skin depth, (sd) is defined as the distance from the surface to where the current density is 1/e times the surface current density (e is the natural log base).

$$sd = \sqrt{\rho/\pi * \mu * f}$$

where $\rho$ is the resistivity of copper and is given by $\rho=0.69 \times 10^{-6}$ ohm-in at 20° C., and $\mu=0.4 \pi \times 10^{-8}$.

The simplest form of an equation for calculating high frequency winding losses for arbitrary current waveforms is given by:

$$Rac/Rdc(\text{skin effect}) = x*(e^{2x} - e^{-2x} + 2\sin(2x))/(e^{2x} + e(-2x) - 2\cos(2x)),$$

where x is layer thickness/skin depth.

Although the current density tails off exponentially from the surface, the high frequency resistance is the same as if the current density were constant from the surface to the penetration depth, then went abruptly to zero. What this means, is that regardless of the foil's thickness, the minimum resistance (AC resistance at a specified frequency) is limited to the DC resistance at the skin depth. Thus for one layer, or turn for a helical winding, the the layer thickness may be as thick as desired, with no increased losses above the skin depth.

For multilayer coils the proximity effect is often the dominate effect. The apparent increase in the resistance of the conductors is caused by eddy currents in the conductors due to the magnetic fields impressed upon the conductors from other conductors in the windings. Note however that these eddy currents will exist even if the winding is open circuit. The losses exist with no net current flow, giving an infinite resistance. This is the situation with an electrostatic shield and a liquid cooled metallic heat exchanger inserted between the primary and secondary winding. The simplest form of the above equation is given by:

$$Rac/Rdc(\text{proximity effect}) = (2/3)*(m^2-1)*x* (e^x - e^{-x} + 2\sin(x))/(e^x + e(-x) - 2\cos(x)),$$

where x is the layer thickness/skin depth and m is the number of layers. This equation shows that the drastic increase in the losses due to proximity effects when more layers (turns) are used in a transformer winding, and why the layer thickness must be kept at value equal to the skin depth or less.

The surface temperature of the coupler 20 is a safety issue related to user contact during removal after charging. Contact pain thresholds according to UL-1012 ranges from 60° C. to 90° C., based on surface material and type of contact. However, human factors and user friendliness design goals are in the 60° C. to 70° C. temperature range, or lower. Constrained by the fixed external size and shape of a compact coupler design, liquid cooling is necessary at charge rates above 15 to 25 kw. At very high charge rates, increased cooling capacity is readily obtained by increasing flow rates and/or chilling the coolant, both of which can be accomplished by conventional increases in the size of the pump 42 and/or refrigeration unit 45 within the off-board charge station 40.

The above discussion has shown that a space exists within a winding that exhibits no magnetic fields. This space can be used to place a metallic heat exchanger. With the use of helical turns, the liquid cooled heat exchanger is very compact and provides an optimum surface area to cool the remaining turns of the winding. This is only applicable to a primary winding interleaved between a split secondary windings, and also only when the primary winding is an even number of turns.

Referring to FIG. 4 and, the details of the construction of the charge probe 20 will be discussed. FIGS. 4 and 5 illustrate top and side views of the internal portion of the charge probe 20, respectively. As can be seen from FIG. 5, the heat exchanger 30 is conductively bonded between respective pairs of turns of the primary winding 25 by means of the adhesive 31. The heat exchanger may be constructed by providing a metal base to which a cover is attached. The cover may be attached to the base using a metal bond, such as is provided by a resistance or ultrasonic weld, or a plastic heat stake, for example.

The internal coolant flow passages provided by the heat exchanger 30 may be configured in several ways. One approach is to construct a thin, flat, flexible bladder 30 made of metal, such as copper. The primary windings 25 are bonded directly to the flat coolant heat exchanger 30 in order to provide good thermal contact, a large heat transfer area, and a very thin profile. The inlet and outlet coolant passage transition from a very thin (0.050", nominal) rectangular cross sectional shape under the winding 25 to a round tube shape (0.25 inches in diameter) for attachment to the flexible coolant lines 32a within the hose 26.

Thus there has been described a new and improved a liquid cooled metallic inductive charging probe for use in high power battery charging apparatus, and the like. It is to be understood that the above-described embodiment is merely illustrative of some of the many specific embodiments which represent applications of the principles of the present invention. Clearly, numerous and other arrangements can be readily devised by those skilled in the an without departing from the scope of the invention.

What is claimed is:

1. In an inductive charging apparatus for use in charging a battery, which apparatus comprises a charging coupler that is insertable into a charge port that is coupled to the battery, and wherein the charge port comprises a housing, an opening into which the charging coupler is inserted, and a secondary core surrounded by secondary windings, wherein said charging coupler comprises:

a housing;

a primary magnetic core disposed in the housing;

a primary winding having an even number of primary turns disposed around the primary magnetic core;

a hollow coolant conducting heat exchanger symmetrically disposed between the primary turns of the primary winding.

2. The charging coupler of claim 1 wherein the heat exchanger is thermally bonded to the primary turns of the primary winding by means of heat conducting adhesive.

* * * * *